INVENTOR
W. J. WOLF, JR.
BY
Charles Scott Phelan
ATTORNEY

| INPUT SIGNALS | | | JUNCTION POTENTIAL | | NEGATIVE SIGNAL TO TRANSISTOR | COMPLEMENT | TRANSISTOR CONDUCTING | OUTPUT SIGNAL |
|---|---|---|---|---|---|---|---|---|
| I | $\bar{I}$ | J | 52 | 54 | | | | OUT |
| 0 | 1 | 0 | 0 | 1 | 22 | YES | 22 | 0 |
| 1 | 0 | 0 | 1 | 0 | 23 | YES | 23 | 1 |
| 0 | 1 | 1 | 0 | 1 | 22 | NO | 23 | 1 |
| 1 | 0 | 1 | 1 | 0 | 23 | NO | 22 | 0 |

United States Patent Office 3,462,613
Patented Aug. 19, 1969

3,462,613
ANTICOINCIDENCE CIRCUIT

William J. Wolf, Jr., New Shrewsbury, N.J., assignor to Bell Telephone Laboratories, Incorporated, Murray Hill, N.J., a corporation of New York Filed Dec. 19, 1966, Ser. No. 602,947
Int. Cl. H03k 19/20
U.S. Cl. 307—216 6 Claims

ABSTRACT OF THE DISCLOSURE

A logic circuit is developed from a combination of a complementing toggle flip-flop and a gate arranged to produce drive signals for complementing the flip-flop under prescribed conditions so that the flip-flop stores the EXCLUSIVE OR function of two separate input variables. A feedback shift register including an EXCLUSIVE OR operation is also described.

BACKGROUND OF THE INVENTION

This invention is an anticoincidence circuit that is more particularly described as a complementing bistable circuit arranged with an input steering circuit and combined with a control gate, the combination being arranged to produce and store an EXCLUSIVE OR function of two separate input variables.

Prior art electronic feedback shift registers, in which the output state of some stage of the register is looped back to one or more intermediate stages, often comprise EXCLUSIVE OR gates interposed between the stages of a tandem array of flip-flop stages. The EXCLUSIVE OR gates and the flip-flop stages are separate logic packages that are interconnected in accordance with well-known logic patterns. For instance the inputs of an EXCLUSIVE OR gate interposed between a previous stage and a subsequent stage in the tandem array are connected respectively to the output of the previous stage and to the output of the stage having its output state looped back. The output of the EXCLUSIVE OR gate is connected to the input of the subsequent stage.

The flip-flop circuit is a bistable circuit that is constrained to assume one or the other of two stable states in response to corresponding states of double-rail control signals at the time of a predetermined transition of a clock drive signal.

In the prior art, transistor-resistor logic (TRL) circuits have often been used as the EXCLUSIVE OR gates. Each transistor-resistor logic (TRL) circuit is arranged as a NOR logic gate, and three TRL NOR gates plus an inverter are required in an EXCLUSIVE OR gate producing a double-rail output. Each TRL NOR gate includes a plurality of inputs through separate resistors to a base electrode of a transistor and an output from a collector electrode of the transistor. The EXCLUSIVE OR gates therefore are a large cost factor relative to the cost of each flip-flop.

If each EXCLUSIVE OR gate and the subsequent stage for storing the function were designed as an integral unit, many components could be eliminated as long as the unit performs an EXCLUSIVE OR operation and stores the resulting function.

SUMMARY OF THE INVENTION

An object of the invention is to improve EXCLUSIVE OR circuits.

Another object is to combine a register stage with input circuitry to produce and store an EXCLUSIVE OR function.

A further object of this invention is to reduce the number of active components used for producing an EXCLUSIVE OR function in a register.

Another object is the development of one circuit package that produces and stores an EXCLUSIVE OR function of two variables more economically than previously possible through use of general purpose transistor-resistor logic circuits.

These and other objects of the invention are realized in a combination of a complementing bistable circuit arranged with an input steering circuit and combined with a control gate which produces trigger pulses for complementing the state of the bistable circuit only when a predetermined one of two separate input variables is a low level. A first input variable and its complement initially condition the input steering circuit to constrain the bistable circuit to assume one or the other of two states. When a first timing signal during a clock cycle makes a predetermined transition, the bistable circuit is constrained to assume a state that agrees with the complement of the first input variable. The control gate thereafter produces a second timing signal during the same clock cycle for complementing the state of the bistable circuit only if a second input variable is a low level. The combination thereby produces and stores in the bistable circuit an EXCLUSIVE OR function of the two input variables.

A feature of the invention is the application of one input variable to a control gate for producing a predetermined timing signal transition that complements a bistable circuit state which has been in agreement with the complement of another input variable and thereby produces an EXCLUSIVE OR function of two input variables.

BRIEF DESCRIPTION OF THE DRAWINGS

A better understanding of the invention may be derived from the detailed description following if that description is considered with respect to the attached drawings, in which.

DETAILED DESCRIPTION

Figure 1:
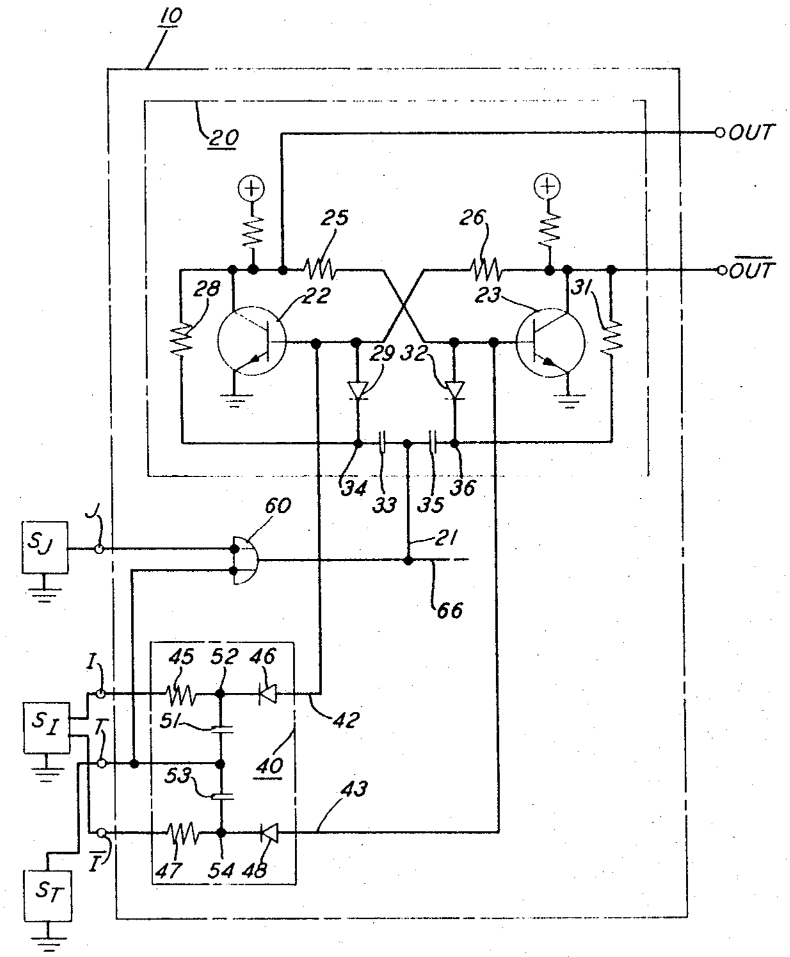
FIG. 1 is a schematic drawing of a complementing bistable circuit arranged with an input steering circuit and combined with a control gate to produce and store an EXCLUSIVE OR function.
Figures 2, 4:
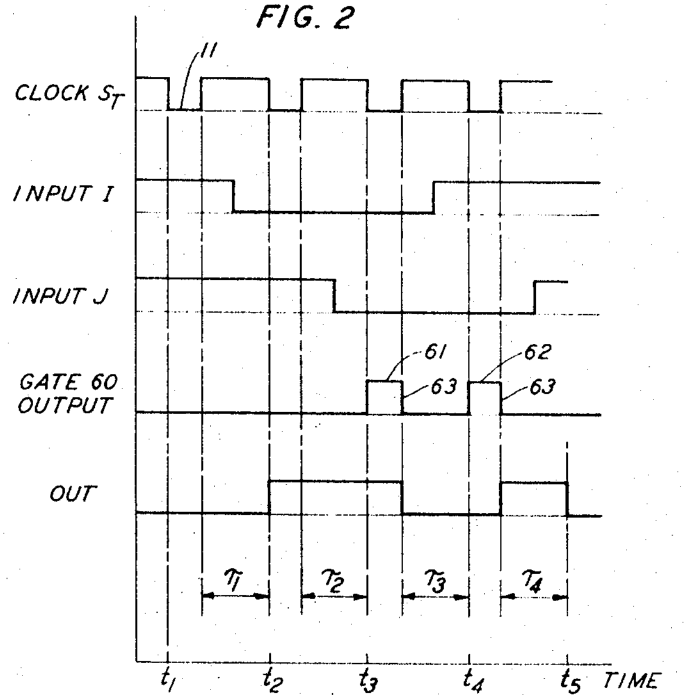
FIG. 2 is a timing diagram for the embodiment of FIG. 1.
FIG. 4 is a truth table for the embodiment of FIG. 1.

Referring now to FIG. 1, there is shown an anti-coincidence circuit 10 that produces at a principal output terminal OUT an EXCLUSIVE OR function of a double-rail input variable and an independent variable applied respectively to input terminals I, $\bar{I}$ and input terminal J. The EXCLUSIVE OR function of the principal variables applied to the terminals I and J is stored in a complementing bistable circuit 20 in response to a timing drive signal applied to a timing lead T. The complementing bistable circuit 20 is a circuit having two stable states discernible by output signals produced at the output terminals OUT and $\overline{OUT}$. After a reference level clock signal, such as the pulse 11 shown commencing at a time $t_1$ in FIG. 2, is applied in FIG. 1 from a clock source $S_T$ to the timing lead T and the bistable circuit 20 has settled into a final conduction state for the duration of an interval $\tau_1$, shown in FIG. 2, the output signal produced on the principal output terminal OUT corresponds with the EXCLUSIVE OR function of the principal variables applied to the input terminals I and J at the time $t_1$.

Figure 3:
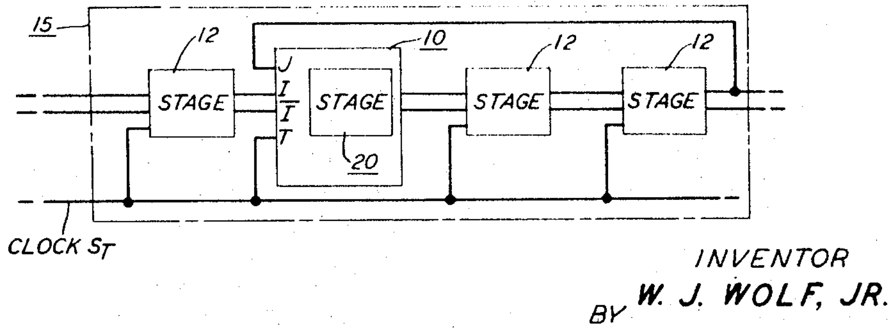
FIG. 3 is a block diagram of a feedback shift register.

Referring to the FIG. 3, the anticoincidence circuit 10 is shown interposed in a tandem array of shift register stages 12 so that the bistable circuit 20 is one of the stages of a shift register 15. The complementing bistable circuit 20 is a conventional circuit similar to those used in the stages 12 of the feedback shift register 15 but is arranged to assume a complementary state of conduction when triggered by a complement drive signal applied over a complement lead 21 shown in FIG. 1.

Referring again to FIG. 2, the input signals applied to the input terminals I, $\bar{I}$, and J have either one change of level or no change of level during each clock cycle. A clock cycle in FIG. 2 elapses between the times $t_1$ and $t_2$, $t_2$ and $t_3$, etc. Any change of the input signal levels should occur during the time intervals $\tau_1$, $\tau_2$, etc. between the clock pulses as shown in FIG. 2.

The bistable circuit 20 has a complementing input connection of a type which is known in the art. Transistors 22 and 23, each arranged in grounded-emitter configurations, represent the active conduction devices of the bistable circuit; and the collector electrode of each is cross-coupled to the other by resistors 25 and 26. A resistor 28 connected in series with a diode 29 provides feedback coupling from the collector electrode of the transistor 22 to the base electrode thereof. Similar feedback is provided by way of a resistor 31 and a diode 32 for the transistor 23. The diodes 29 and 32 are poled to conduct away from their respective transistor base electrodes toward capacitors 33 and 35, respectively, which couple the cathodes of those diodes to the complement lead 21.

Each negative-going transition of input signals on the lead 21, hereinafter referred to as a complement drive signal, is coupled through the capacitors 33 and 35 to force into conduction the one of the diodes 29 or 32 which is connected to the base electrode of the conducting transistor in the bistable circuit 20. Such diode conduction reduces the potential on the base electrode of the conducting transistor below ground, thereby biasing such transistor to cut-off and transferring bistable circuit conduction to the other one of the two transistors.

Signals indicating the conduction states of the transistors in the bistable circuit 20 appear at terminals OUT and $\overline{\text{OUT}}$ which are connected to the collector electrodes of transistors 22 and 23, respectively. As is known in the art, each negative-going signal transition on the lead 21 causes the bistable circuit 20 to change its conduction state, regardless of the previous state of conduction therein, and thereby produces a corresponding change in the state of signals at the terminals OUT and $\overline{\text{OUT}}$. Thus it has been shown that the complement drive signal makes the circuit 20 change its state of conduction into a complementary state of the one that had existed just prior to the application of the complement drive signal.

An input steering circuit 40 is arranged to steer negative potential signals, resulting from the clock signal on the timing lead T, alternatively over a set lead 42 or a reset lead 43 to the base electrodes of the transistors 22 and 23 and under control of the double-rail input variable applied to the input terminals I and $\bar{I}$. The double-rail input variable is produced by a signal source $S_I$ and is coupled to the terminals I and $\bar{I}$. A resistor 45 and a diode 46 arranged in series circuit couple the input terminal I to the set lead 42 and therethrough to the base electrode of the transistor 22. A resistor 47 and a diode 48 similarly arranged in series circuit couple the input terminal $\bar{I}$ to the reset lead 43 and therethrough to the base electrode of the transistor 23. A capacitor 51 couples the timing lead T to a junction 52 between the resistor 45 and the diode 46. A capacitor 53 couples the timing lead T to a junction 54 between the resistor 47 and the diode 48. The diodes 46 and 48 are respectively poled to apply negative potential signals to the base electrodes of the transistors 22 and 23.

The steering circuit 40 and the bistable circuit 20 are arranged as a toggle flip-flop. At first during each clock cycle, the steering circuit 40 is conditioned by the input signals applied to the terminals I and $\bar{I}$ to constrain the bistable circuit 20 to assume one or the other of its stable states of conduction in agreement with the complement input signal $\bar{I}$, no matter which conduction state previously existed in the circuit 20. Since doublerail input signals applied to the input terminals I and $\bar{I}$ are resistively coupled to the junctions 52 and 54, those junctions are held at alternative potential levels. One junction is held at a high level and the other near ground potential. When the clock signal on the timing lead T makes a negative-going transition commencing a clock cycle, the capacitors 51 and 53 couple that transition to the junctions 52 and 54. The junction, which was near ground potential before the negative-going transition was applied, is now driven to a negative potential; and its associated diode, either 46 or 48, is biased to conduct. The other of the diodes 46 or 48, associated with the junction that had been at a high level, remains cut off.

Assuming that a high level signal is applied to the terminal I and a low level signal is applied to the terminal $\bar{I}$ just prior to the negative-going transition of the clock signal, the junction 52 is held at a high potential level; and the junction 54 is held at a low, or near ground, potential level until the clock signal transition occurs. When the negative-going transition occurs, that transition is coupled through the capacitors 51 and 53 respectively to the junctions 52 and 54. Junction 54 is driven to a substantial negative potential, and junction 52 is driven to a lower positive potential. The negative potential on the junction 54 forward-biases the diode 48, and it conducts. Diode 46 remains cut off. Conducting diode 48 couples the negative potential to the reset lead 43 and therethrough to the base electrode of the transistor 23. The negative potential reverse biases the base-emitter junction of the transistor 23 and cuts off the transistor 23. Transistor 22 is biased into conduction by a resulting high potential on the collector electrode of the transistor 23. The output terminal $\overline{\text{OUT}}$ therefore produces a high level signal, and the terminal OUT produces a low level signal. These output levels are produced regardless of what state of conduction existed in the bistable circuit 20 before the clock signal transition occurs.

Conversely, if a low level signal is applied to the terminal I and a high level signal is applied to the terminal $\bar{I}$ just prior to the negative-going transition of the clock signal commencing a clock cycle, the transistor 22 is cut off as a result of the negative-going transition; and the transistor 23 is turned on. Thus the output terminal OUT will produce a high level signal, and the output terminal $\overline{\text{OUT}}$ will produce a low level signal. These latter output levels are produced no matter which state of conduction existed in the bistable circuit 20 before the clock signal transition occurs.

Therefore, after the negative-going clock signal transition, commencing each clock cycle, the bistable circuit 20 is constrained into the first state of conduction of the clock cycle, and the output terminal OUT produces a level similar to the level applied to the terminal $\bar{I}$ just prior to the relevant clock signal.

A gate 60 is a NOR gate arranged to produce a negative-going output signal transition, or complement drive signal, on the complement lead 21 when the input signal applied to the terminal J is low and the clock signal goes from low to high. As previously explained, such a negative-going signal transition on the complement lead 21 constrains the bistable circuit 20 to assume the complements of the conduction state then existing. The inputs to the gate 60 are connected respectively to the terminal J and to the timing lead T. A signal source $S_J$ produces and applies an input signal to the terminal J. Clock source $S_T$ which produces and applies clock signals, such as shown in FIG. 2, to the timing lead T also applies the clock signals through the timing lead T to an input of the gate 60.

The output signal from the gate 60 is shown in FIG. 2.

Gate 60, which is used for a NOR operation, produces a low level signal at all times except when both the input signal on the terminal J and the clock signal applied to lead T are low. When the input signal on the terminal J and the clock signal are both low, the gate 60 produces a high signal such as the pulses 61 and 62 shown in FIG. 2. The inputs to the gate 60 are both low only when the signal on terminal J is low and the signal on the lead T has just completed a negative-going transition. When the signal on the timing lead T goes positive, upon termination of the low clock signal, the signal produced by the gate 60 makes a negative-going transition 63, or complement drive signal, causing the bistable circuit 20 to assume its complementary state of conduction in a manner that has previously been described. This complement drive signal only occurs while the circuit 20 is conducting in its temporary state.

When the clock signal is low while the input to the terminal J is a high level, the bistable circuit 20 is not constrained to assume its complementary state of conduction because the gate 60 does not generate the positive signal level which precedes each negative-going transition of the output from the gate 60.

During each clock cycle, the circuit 10 performs a two step operation. First, in response to the negative-going transition of the clock signal, the circuit 20 is constrained into the first conduction state depending upon the input signal $\bar{I}$. At the same time the gate 60 is cocked for producing a complement drive signal only if the input signal J is low. Secondly, in response to the positive-going transition of the clock signal, the gate 60 produces a complement drive signal to trigger the circuit 20 into its complementary state only if the gate 60 previously had been cocked.

The output signal from the terminal OUT can be determined during-read-out intervals such as the intervals $\tau_1$, $\tau_2$, $\tau_3$, and $\tau_4$ interspersed between the clock pulses in FIG. 2 and after the bistable circuit 20 settles into a second, or final, conduction state if the circuit has been complemented. The output signal occurring during the interval $\tau_1$ is the output of the circuit 10 for input signals existing at the time $t_1$. The output signals occurring during subsequent intervals $\tau_2$, $\tau_3$, and $\tau_4$ respectively represent response to input signals existing at the times $t_2$, $t_3$, and $t_4$.

Since complementary input variables are applied to the input terminals I and $\bar{I}$, and an independent input variable is applied to the input terminal J; there are only four permutations of the input variables. The input variables can be represented by a "1" for a high level input and a "0" for a low level input. Permutations of the input signals together with states of the bistable circuit 20 are readily arranged into a truth table as shown in FIG. 4.

In FIG. 4 each combination of the input variables is listed in a separate row of the truth table under the heading "INPUT SIGNALS." The potential of the junctions 52 and 54 is shown under the heading "JUNCTION POTENTIAL," in the same row with the input signal combination which is applicable. The transistor which is turned-off by a negative-going signal from the input steering circuit 40 for the temporary state is shown in the column head "NEGATIVE SIGNAL TO TRANSISTOR." Whether or not a negative-going transition is thereafter produced by the gate 60 during the same clock cycle is shown in a similar manner under the heading "COMPLEMENT." The column headed "TRANSISTOR CONDUCTING" indicates which transistor is conducting in the final state of conduction for each combination of input signals after the two step operation in response to the drive signal transition on the timing lead T. The column headed "OUTPUT SIGNAL" indicates the output signal level on the terminal OUT during the final state of conduction as a result of the input signals of the respective combinations.

The output terminal OUT produces a level during the final state of conduction that corresponds with the EXCLUSIVE OR function of the input signals applied to the input terminals I and J. A "0" level occurs on the output terminal OUT in response to concurrent low signals applied to both of the terminals I and J at a time when a negative-going transition occurs on the timing lead T. For example see the first row of the table in FIG. 4 and also see the interval $\tau_3$ in FIG. 2 where there is shown the output OUT resulting from inputs I and J at the time $t_3$. A "1" occurs on the output terminal OUT in response to a high signal on the terminal I and a low signal on the terminal J at a time when a negative-going transition occurs on the timing lead T. For example see the second row of the table in FIG. 4 and also see the interval $\tau_4$ in FIG. 2 where there is shown the output OUT resulting from inputs I and J at the time $t_4$. A "1" also occurs on the output terminal OUT in response to a low signal on the terminal I and a high signal on the terminal J when a negative-going transition occurs on the timing lead T. For example see the third row of the table in FIG. 4 and also see the interval $\tau_2$ in FIG. 2 where there is shown the output OUT resulting from the inputs I and J at the time $t_2$. A "0" occurs on the output terminal OUT in response to high signals applied to both of the terminals I and J when negative-going transition occurs on the timing lead T. For example see the fourth row of the table in FIG. 4 and also see the interval $\tau_1$ in FIG. 2 where there is shown the output OUT resulting from the inputs I and J at the time $t_1$. Thus the output signals produced at the output terminal OUT during the final state of conduction agree with the EXCLUSIVE OR function of the principal input variables applied to the input terminals I and J.

This EXCLUSIVE OR function is produced by constraining the circuit 20 into the first state agreeing with the complement input $\bar{I}$ and thereafter complementing the circuit 20 only if the input J is low when the circuit 20 is first constrained to agree with the complement input $\bar{I}$.

As shown in FIG. 3, when the anticoincidence circuit 10 of FIG. 1 is interposed between a previous stage and a subsequent stage in a feedback shift register circuit, the input and output terminals of the circuit 10 are connected in accordance with the conventional logic design of such a shift register. The circuit 20 is the stage in which the EXCLUSIVE OR function is stored. Relative to the circuit 10 the input terminals I and $\bar{I}$ are connected to output terminals of the previous stage in the tandem sequence of stages. The output terminals OUT and $\overline{OUT}$ are connected to the input terminals of the subsequent stage in the sequence of stages. The input terminal J is connected to an output terminal for the principal output signal of whatever stage produces signals that are to be fed back to the stage represented by the bistable circuit 20. The timing lead T is connected to a clock drive circuit of the shift register so that each cycle of the clock signal will cause the anticoincidence circuit 10 to produce and store the EXCLUSIVE OR function of the principal variables applied to the input terminals I and J.

The output of the gate 60, shown in FIG. 1, can advantageously be connected by way of leads, such as the lead 66, to complement triggers of other stages in a register such as the register 15 of FIG. 3. Thus many stages arranged in a configuration similar to the circuits 40 and 20 of FIG. 1 can be driven to produce EXCLUSIVE OR functions by the single gate 60. The number of stages driven by the gate 60 is, of course, limited by fanout restrictions of the gate 60.

The above-detailed description is illustrative of one embodiment of the invention, and it is to be understood that other embodiments thereof will be obvious to those skilled in the art. These additional embodiments are considered to be within the scope of the invention.

What is claimed is:

1. An anticoincidence circuit comprising a bistable circuit having a complement lead and having an input steering circuit coupled to set and reset leads of the bistable circuit and said steering circuit including a timing lead wherein the improvement comprises, gate means having plural inputs and an output, means coupling the timing lead to a first input of the gate means, and means coupling the output of the gate means to the complement lead.

2. A circuit in accordince with claim 1 in which the bistable circuit comprises a flip-flop circuit, a first signal source produces a first series of ON-OFF signals and a complement of the first series of ON-OFF signals, means couple the first series of ON-OFF signals and the complement of the first series of ON-OFF signals to the steering circuit, a second signal source produces a second series of ON-OFF signals, and means couple the second series of ON-OFF signals to a second input of the gate means.

3. A circuit in accordance with claim 2 in which the gate means comprises a NOR circuit, clock means produce a series of drive pulses, and means couple the drive pulses to the timing lead.

4. A circuit in accordance with claim 3 in which the bistable circuit comprises first and second transistors each having collector and base electrodes and arranged in grounded-emitter configurations cross-coupled to conduct alternatively, first resistance-capacitance means coupling the collector electrode of the first transistor to the complement lead, second resistance-capacitance means coupling the collector electrode of the second transistor to the complement lead, first unilateral conducting means coupling the first resistance-capacitance means to the base electrode of the first transistor, and second unilateral conducting means coupling the second resistance-capacitance means to the base electrode of the second transistor.

5. A circuit in accordance with claim 4 in which the steering circuit comprises a third unilateral conducting means coupling the first series of ON-OFF signals to the base electrode of the first transistor, a fourth unilateral conducting means coupling the complement of the first series of ON-OFF signals to the base electrode of the second transistor, a first capacitance coupling the timing lead to the third unilateral conducting means, and a second capacitance coupling the timing lead to the fourth unilateral conducting means.

6. In an anticoincidence circuit comprising a bistable circuit including a complementing input connection, set and reset input connections, and output connections, the improvement comprising means receiving first and second input signals and timing signals, an input steering circuit coupling a first predetermined type of signal transition in said timing signal to one of said set and reset input connection, means coupling said first signal to said input steering circuit for controlling which of said input set and reset connections receives said signal transition, and a gate having an output connected to said complementing input connection and having inputs connected to receive said second and timing signals for coupling a second predetermined type of signal transition in said timing signal to said complementing input connection in response to a predetermined signal level condition of said second signal.

References Cited

UNITED STATES PATENTS

| | | | |
|---|---|---|---|
| 3,278,758 | 10/1966 | Vroman | 307—216 X |
| 3,348,069 | 10/1967 | Petschauer | 328—37 X |

DONALD D. FORRER, Primary Examiner

U.S. Cl. X.R.

307—221, 247, 292; 328—37, 93, 206